US012789716B2

(12) United States Patent
Chang et al.

(10) Patent No.: US 12,789,716 B2
(45) Date of Patent: Nov. 10, 2026

(54) MONITOR HOLDER AND VEHICLE MONITOR DEVICE

(71) Applicants: Futaijing Precision Electronics (Yantai) Co., Ltd., Yantai (CN); HON HAI PRECISION INDUSTRY CO., LTD., New Taipei (TW)

(72) Inventors: Yu-Sheng Chang, New Taipei (TW); Chi-Cheng Wen, New Taipei (TW); Wen-Bin Huang, New Taipei (TW); Hsiu-Fu Li, New Taipei (TW); Yu-Chih Cheng, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 289 days.

(21) Appl. No.: 18/643,912

(22) Filed: Apr. 23, 2024

(65) Prior Publication Data

US 2024/0416847 A1 Dec. 19, 2024

(30) Foreign Application Priority Data

Jun. 13, 2023 (CN) ......................... 202321502423.4

(51) Int. Cl.
*B60R 11/02* (2006.01)
*G01D 11/30* (2006.01)

(52) U.S. Cl.
CPC .......... *B60R 11/0235* (2013.01); *G01D 11/30* (2013.01)

(58) Field of Classification Search
CPC ..... B60R 11/00; B60R 11/02; B60R 11/0235; G01D 11/30
See application file for complete search history.

(56) References Cited

U.S. PATENT DOCUMENTS

| | | | | |
|---|---|---|---|---|
| 11,577,672 B2 * | 2/2023 | Narita | F16F 15/08 | |
| 11,746,848 B1 * | 9/2023 | Chang | B60R 11/0229 | 248/573 |
| 2022/0227307 A1 * | 7/2022 | Shout | B60K 35/10 | |
| 2023/0311781 A1 * | 10/2023 | Chang | B60R 11/0229 | 296/187.05 |
| 2025/0128667 A1 * | 4/2025 | Wu | B60R 11/0235 | |

* cited by examiner

*Primary Examiner* — Nguyen Q. Ha
(74) *Attorney, Agent, or Firm* — ScienBiziP, P.C.

(57) ABSTRACT

A monitor holder is provided, comprising a connecting component, a base and an absorbing component, the connecting component is connected to a monitor, the base is provided with a first groove, the connecting component is arranged in the first groove, the first groove is provided with a space configured for the connecting component to slide, the base is connected to a vehicle body; the absorbing component is arranged between the connecting component and the base, the connecting component and the base abut against the absorbing component, the base wraps around the connecting component when the absorbing component is deformed. A vehicle monitor device is also provided.

15 Claims, 6 Drawing Sheets

MONITOR HOLDER AND VEHICLE MONITOR DEVICE

FIELD

The present disclosure relates to field of vehicle monitor technology, particularly to a monitor holder, and a vehicle monitor device.

BACKGROUND

Existing vehicle monitors are fixed on a skeleton of the vehicle. Users can view reversing images, vehicle control pages or entertainment images by the vehicle monitors.

In the event of an accident, the human body violently collides with the vehicle monitors, and the fixed vehicle monitors in the vehicles may cause a larger reaction force on the human body, the human body may be harmed, so the vehicle monitors may be a hazard in car accidents.

Thus, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of the embodiments described herein.

Several definitions that apply throughout this disclosure will now be presented.

The term "coupled" is defined as coupled, whether directly or indirectly through intervening components, and is not necessarily limited to physical connections. The connection may be such that the objects are permanently coupled or releasably coupled. The term "substantially" is defined to be essentially conforming to the particular dimension, shape, or other feature that the term modifies, such that the component need not have that exact feature. The term "comprising," when utilized, means "including, but not necessarily limited to"; it specifically indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein comprises any and all combinations of one or more of associated listed items.

Some embodiments of the present application are described in detail. In the case of no conflict, the following embodiments and the features in the embodiments can be combined with each other.

Figure 1:
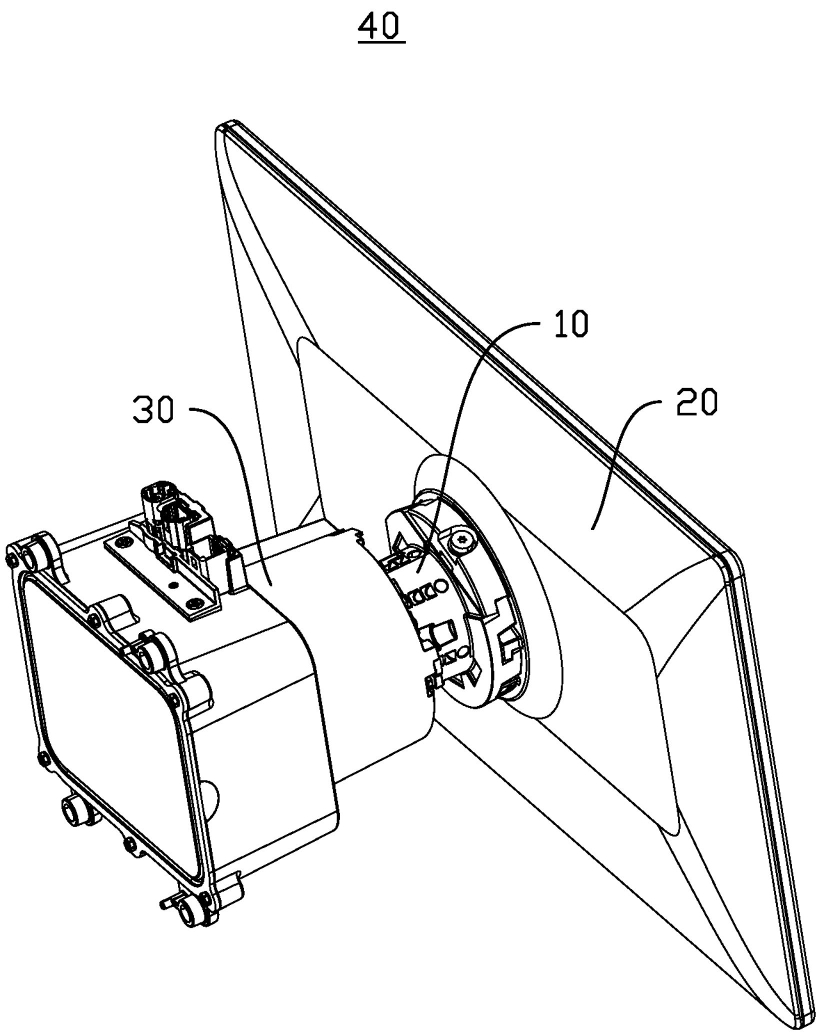
FIG. 1 illustrates an embodiment of a structure view of a vehicle monitor device in the present disclosure.
Figure 2:
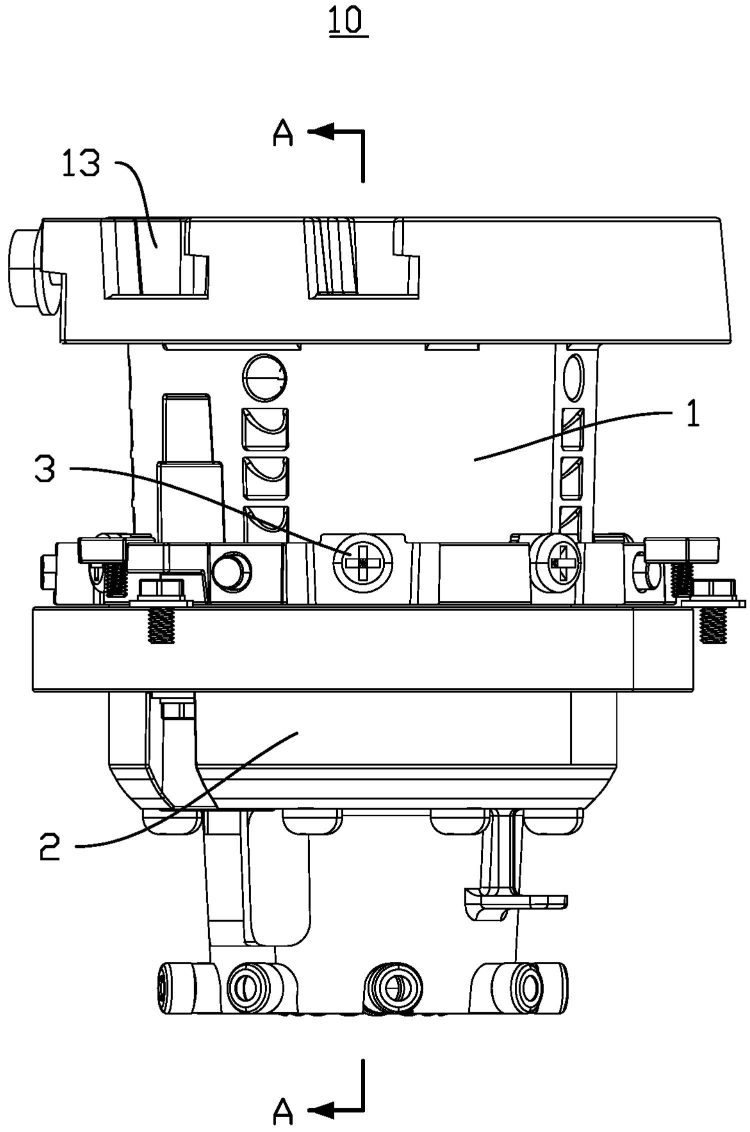
FIG. 2 illustrates an embodiment of a structure view of a monitor holder in the present disclosure.

Referring to FIG. 1 and FIG. 2, one embodiment of the present application discloses a monitor holder 10. The monitor holder 10 holds a monitor 20 to a vehicle body after the vehicle monitor 20 is mounted onto the monitor holder 10. The monitor holder 10 includes a connecting component 1, a base 2, and an absorbing component 3. The connecting component 1 is connected to the vehicle monitor 20, the base 2 is connected to the vehicle body, the connecting component 1 is removably connected to the base 2.

A main supporting structure of the monitor holder 10 is the connecting component 1 and the base 2, the base 2 is connected to the vehicle body, the connecting component 1 is removably connected to the base 2, the vehicle monitor 20 is connected to the connecting component 1, thereby the vehicle monitor 20 can be mounted and held to the vehicle body. In one embodiment, the vehicle body is provided with a rotating base 30, the base 2 is connected to the rotating base 30. A rotating vehicle monitor mechanism includes the monitor holder 10 and the vehicle monitor 20.

Figure 3:
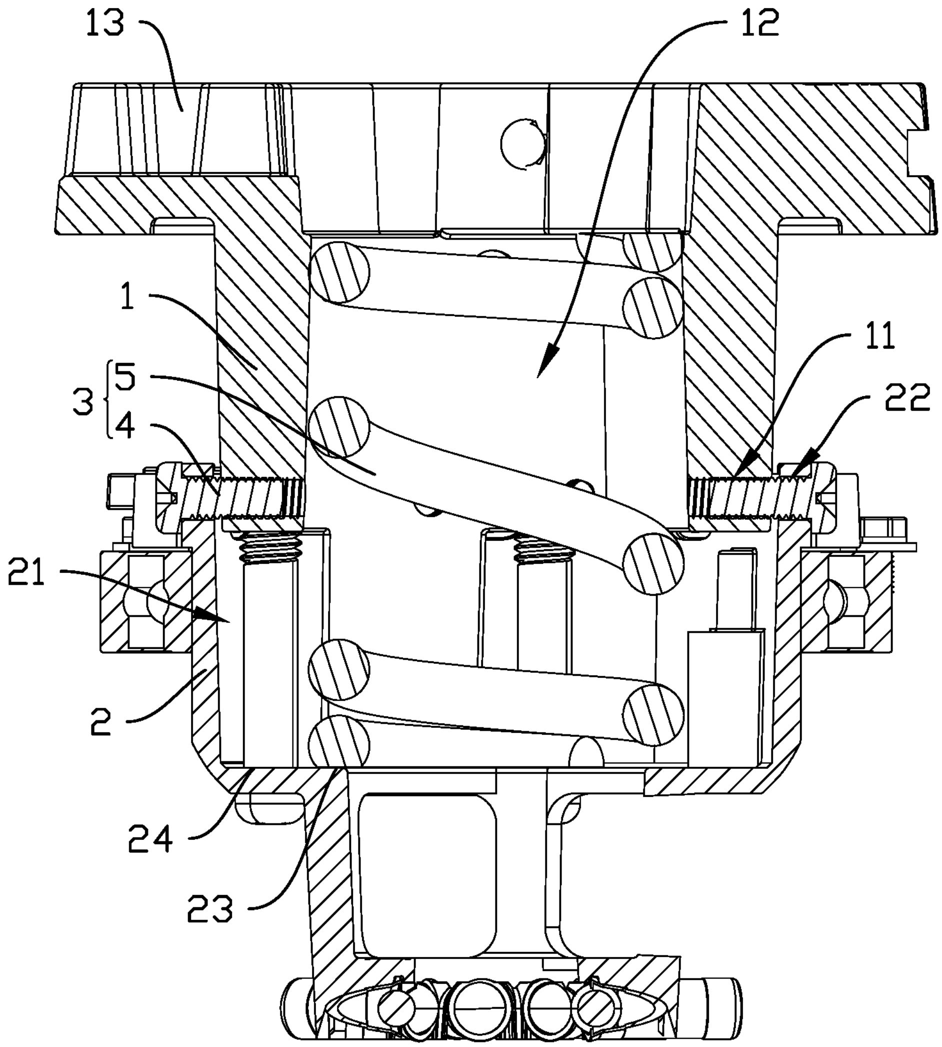
FIG. 3 illustrates a section view of the monitor holder along an A-A line in FIG. 2.

Referring to FIG. 1 and FIG. 3, the base 2 defines a first groove 21, an opening of the first groove 21 is facing the connecting component 1. One end of the connecting component 1 is received in the first groove 21, another end of the connecting component is extended out of the first groove 21 to connect the vehicle monitor 20. A length direction of the connecting component 1 is consistent with a depth direction of the first groove 21, a distance is left between the end of the connecting component 1 and a bottom of the first groove 21. The first groove 21 has a space for the connecting component 1 to slide along the depth direction of the first groove 21.

The absorbing component 3 is arranged between the connecting component 1 and the base 2. The connecting component 1 and the base 2 abut against the absorbing component 3. The base 2 and the connecting component 1 have a force action with the absorbing component 3. When the monitor holder 10 is in a normal state, a force of the base 2 and the connecting component 1 between the absorbing component 3 is within a certain force range, the absorbing component 3 does not deform, and the base 2 is static to the connecting component 1. When the monitor holder 10 is in an impact state, the force of the base 2 and the connecting component 1 between the absorbing component 3 is not within the certain force range, the absorbing component 3 is deformed, the connecting component 1 is slithered relative to the base 2.

In one embodiment, the absorbing component 3 is arranged between the connecting component 1 and the base 2, and the first groove 21 has the space for the connecting component 1 to slide in the depth direction of the first groove 21. When the monitor holder 10 is in the normal state, the absorbing component 3 can maintain a relative rest state between the connecting component 1 and the base 2. When an accident is happened, if the human body violently collides with the vehicle monitor 20, the monitor holder 10 is in the impact state, there is a large force between the connecting component 1 and the base 2 on the absorbing component 3. The absorbing component 3 is deformed to makes the vehicle monitor 20 and the connecting component 1 move backward to the first groove 21. When the absorbing component 3 is deformed, the absorbing component 3 will absorb kinetic energy of impact to achieve a buffering effect. The damage of the human body reduces.

In one embodiment, a deformation of the absorbing component 3 can be an elastic deformation, such as elastic expansion, or an inelastic deformation, such as fracture.

The normal state is explained as follow: when a user is driving the vehicle, the connecting component 1 and the base 2 support the vehicle monitor 20. Due to the gravity of the vehicle monitor 20 or a pressure of the user touching the vehicle monitor 20, a force is generated between the connecting component 1 and the base 2. The force is usually within a certain force range, which can be set according to actual needs, and the force range can be adjusted by deformation difficulty and quantity of the absorbing component 3.

The impact state is explained as follow: when functions of the vehicle is abnormal or performance test of the vehicle is performed, for example, the human body accidentally hits the vehicle monitor 20, or the vehicle is in an impact test, the vehicle monitor 20 is hit, there will be the huge force between the connecting component 1 and the base 2, the force exceeds the certain force range.

In one embodiment, the absorbing component 3 includes a plurality of first absorbing components 4 and a second absorbing component 5. The plurality of first absorbing components 4 is arranged between the connecting component 1 and the base 2. When the connecting component 1 slides in the first groove 21 of the base 2 or tends to slide, two ends of each of the plurality of first absorbing components 4 are subjected to opposing forces between the connecting component 1 and the base 2, and the plurality of first absorbing components 4 bears a shear force between the connecting component 1 and the base 2.

The second absorbing component 5 is arranged between the connecting component 1 and the base 2, when the connecting component 1 slides in the first groove 21 of the base 2 or tends to slide, two ends of the second absorbing component 5 are subjected to opposing forces between the connecting component 1 and the base 2, and the second absorbing component 5 bears a stress force between the connecting component 1 and the base 2.

When the monitor holder 10 is in the normal state, the plurality of first absorbing components 4 and the second absorbing component 5 can prevent the connecting component 1 and the base 2 from sliding, the connecting component 1 and the base 2 can remain the rest state. When the monitor holder 10 is hit, the plurality of first absorbing components 4 and the second absorbing component 5 can absorb kinetic energy to achieve the better buffering effect and improve safety of the user.

In other embodiments, a hardness of the plurality of first absorbing components 4 is larger than a hardness of the second absorbing component 5, and a deformation difficulty of the plurality of first absorbing components 4 is larger than a deformation difficulty of the second absorbing component 5. When the monitor holder 10 is hit, the plurality of first absorbing components 4 will first be subjected to deformation, and then the second absorbing component 5 will be deformed to achieve an effect of multi-stage buffering.

Figure 4:
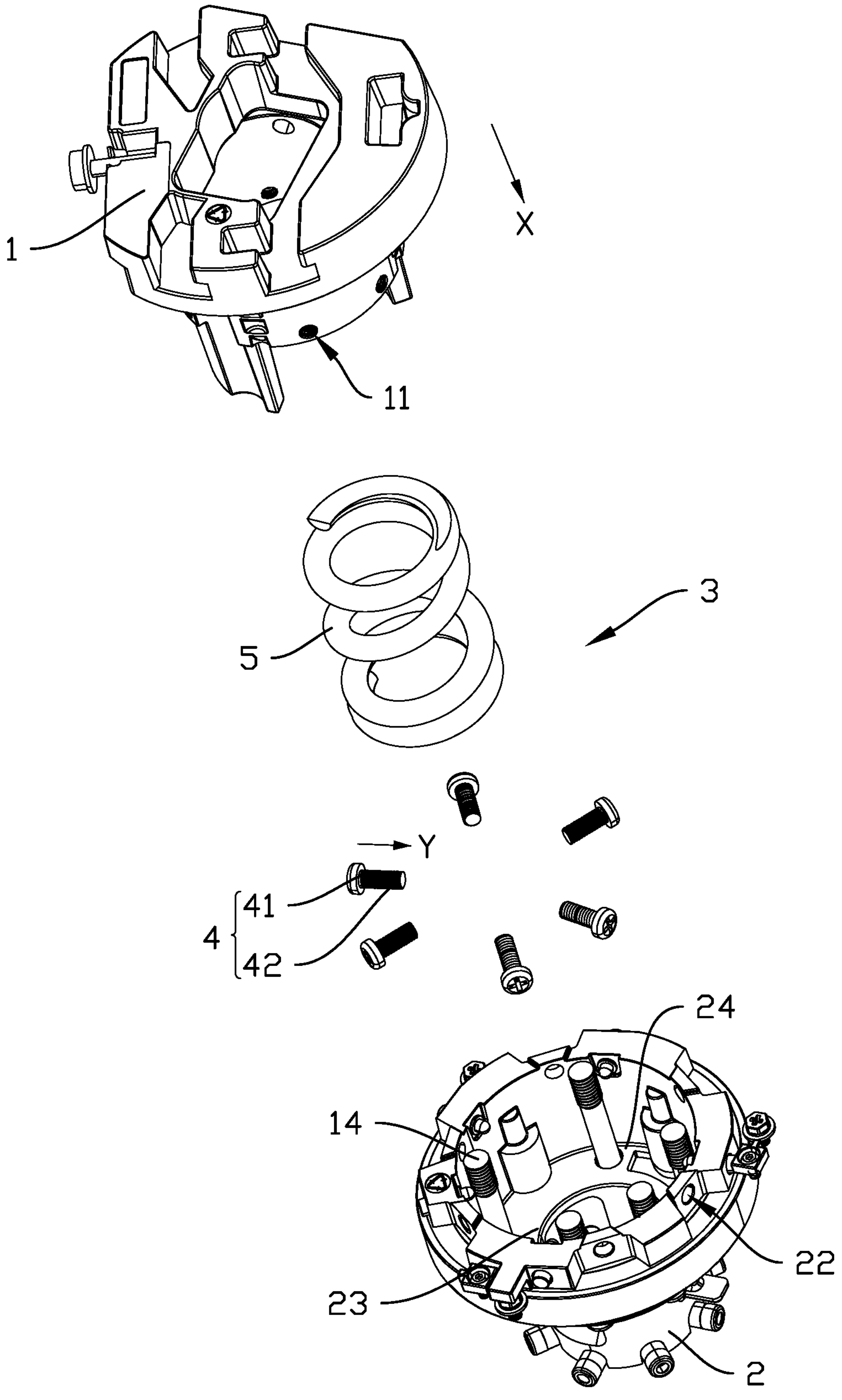
FIG. 4 illustrates an embodiment of an exploded view of a connecting component, a base, a first absorbing component and a second absorbing component in the present disclosure.

Referring to FIG. 4, a shape of the plurality of first absorbing components 4 is strip shaped. Each of the plurality of first absorbing components 4 includes a first end 41 and a second end 42, the first end 41 is connected to the base 2, the second end 42 is connected to the connecting component 1, the first end 41 and the second end 42 are arranged along a length direction Y of the plurality of first absorbing components 4. An angle is defined between the length direction Y of the first absorbing components 4 and a sliding direction X of the connecting component 1. In one embodiment, the angle is in a range between 0°~90°.

The base 2 is connected to the first end 41, and the connecting component 1 is connected to the second end 42, a force direction of the base 2 on the first end 41 is opposite to a force direction of the connecting component 1 on the second 42, and a first angle is defined between the force direction of the base 2 on the first end 41 and the length direction Y of the plurality of first absorbing components 4, a second angle is defined between the force direction of the connecting component 1 on the second 42 and the length direction Y of the plurality of first absorbing components 4, and the plurality of first absorbing components 4 can bear the shear force between the connecting component 1 and the base 2.

When the monitor holder 10 is in the normal state, the plurality of first absorbing components 4 can bear the shear force between the connecting component 1 and the base 2 through the hardness of the plurality of first absorbing components 4. Before the plurality of first absorbing components 4 is broken, the first end 41 and the second end 42 are relatively fixed, and the base 2 and the connecting component 1 remain the rest state, and the first end 41 and the second end 42 support the connecting component 1 and the base 2.

When the monitor holder 10 is in the impact state, the shear force between the connecting component 1 and the base 2 exceeds a bearing capacity of the plurality of first absorbing components 4, the plurality of first absorbing components 4 breaks and absorbs the kinetic energy, the first end 41 and the second end 42 are mislocated, the connecting component 1 slides relative to the base 2.

In one embodiment, the length direction Y of the plurality of first absorbing components 4 is perpendicular to the length direction of the connecting component 1, and the length direction Y of the plurality of first absorbing components 4 is perpendicular to the sliding direction X of the connecting component 1 to improve the force effect between the plurality of first absorbing components 4, the connecting component 1 and the base 2. Thereby improving kinetic energy absorbing effect of the plurality of first absorbing components 4.

Figure 5:
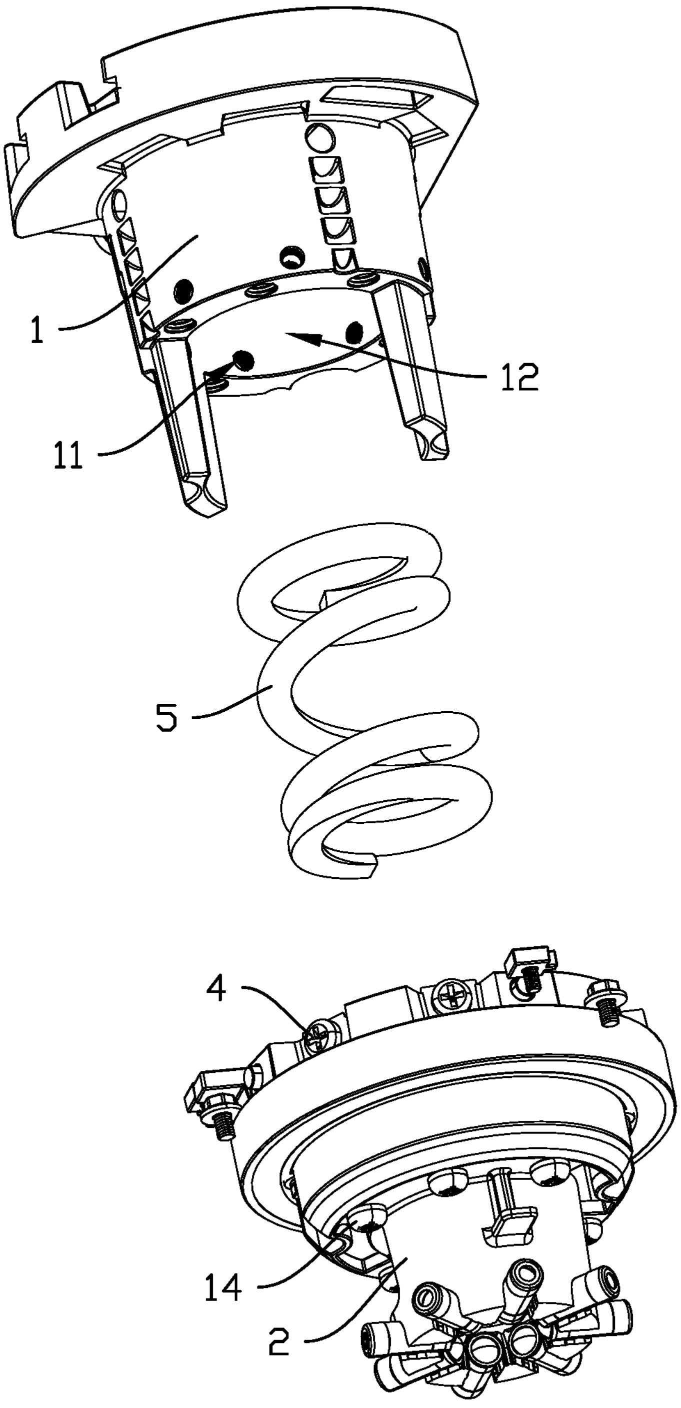
FIG. 5 illustrates an embodiment of an exploded view of a connecting component, a base and a second absorbing component in the present disclosure.

Referring to FIG. 4 and FIG. 5, in some embodiments, the base 2 defines a plurality of mounting holes 22. The plurality of mounting holes 22 is through side wall of the base 2, the plurality of mounting holes 22 is communicated with the first groove 21 and an outer space of the base 2. A plurality of fixed holes 11 is defined on the end of the connecting component 1 received in a first groove 21, the plurality of fixed holes 11 is communicated with the first groove 21. The plurality of mounting holes 22 is corresponded with the plurality of fixed holes 11, a number of the plurality of mounting holes 22 is equal to a number of the plurality of fixed holes 11, one mounting hole 22 corresponds to one fixed hole 11, and the plurality of mounting holes 22 is communicated with the plurality of fixed holes 11.

A dimension of the plurality of mounting holes 22 and a dimension of the plurality of fixed holes 11 are matched to the plurality of first absorbing components 4. The plurality of first absorbing components 4 is routed through the plurality of mounting holes 22 and the plurality of fixed holes 11. The first end 41 is arranged in the plurality of mounting holes 22, the second end 42 is arranged in the plurality of fixed holes 11. The angle is defined between the length direction Y of the plurality of first absorbing components 4 and the sliding direction X of the connecting component 1, and the plurality of first absorbing components 4 is configured to connect the component 1 and the base 2. Before the plurality of first absorbing components 4 is broken, relative slide between the connecting component 1 and the base 2 is limited by the plurality of first absorbing components 4.

In some embodiments, a shape of the plurality of first absorbing components 4 is cylinder shaped, a screw threaded is defined at a perimeter of the plurality of first absorbing components 4, the plurality of first absorbing components 4 can be threaded to the base 2 and/or the connecting component 1. So that connection between the plurality of first absorbing components 4, the connecting component 1 and the base 2 is tight, a connection stability of the connecting component 1 and the base 2 is improved.

In one embodiment, an inner wall of the plurality of mounting holes 22 is provided with a thread surface, and the first end 41 is received in the plurality of mounting holes 22.

In other embodiments, the thread surface is also provided on an inner wall of the plurality of fixed holes 11 and the inner wall of the plurality of mounting holes 22, the first end 41 is received in the plurality of mounting holes 22, the second end 42 is received in the plurality of fixed holes 11. In other embodiments, the thread surface is only provided on the inner wall of the plurality of mounting holes 22, the first end 41 is received in the plurality of mounting holes 22.

In some embodiments, the hardness of the plurality of first absorbing components 4 is less than a hardness of the base 2. For example, the plurality of first absorbing components 4 is made of plastic material, and the base 2 and the connecting component 1 are made of metal material.

The deformation difficulty of the plurality of first absorbing components 4 is less than a deformation difficulty of the base 2, when the monitor holder 10 is hit, the plurality of first absorbing components 4 can be deformed before the connecting component 1 or the base 2 is damaged and absorb the kinetic energy in time to achieve the buffering effect.

The deformation difficulty of the plurality of first absorbing components 4 refers to a difficulty of the plurality of first absorbing components 4 to break under a force. The larger the deformation difficulty of the plurality of first absorbing components 4, the larger the force required for a fracture of the plurality of first absorbing components 4. Material, size, and quantity of the plurality of first absorbing components 4 will affect the deformation difficulty of the plurality of first absorbing components 4. The deformation difficulty of the plurality of first absorbing components 4 can be set according to actual demand of the force range.

In some embodiments, the plurality of first absorbing components 4 is plastic screws, the plastic screw includes a screw column and a nut connected to an end of the screw column. The screw column is a main part of the plurality of first absorbing components 4, an end of the screw column near the nut is the first end 41, an end of the screw column away from the nut is the second end 42.

When the connecting component 1 and the base 2 are installed, one end of the connecting component 1 is received in the first groove 21, then the plastic screw is threaded from an outside of the base 2 to the plurality of mounting holes 22 and the fixed holes 11. The connecting component 1 is connected to the base 2 by the plastic screw. The user can remove the connecting component 1 or the base 2.

In some embodiments, the plurality of first absorbing components 4 is distributed around the connecting component 1. In other embodiments, a number of the plurality of first absorbing components 4 is six, six first absorbing components 4 are distributed around the base 2 in a circumferential direction.

The plurality of first absorbing components 4 can support the connecting component 1 and the base 2. The plurality of first absorbing components 4 forms a plurality of support points in a circular distribution between the connecting component 1 and the base 2, and the connecting component 1 is connected to the base 2 by the plurality of first absorbing components 4. A fracture risk of some first absorbing components 4 caused by unevenly force can be reduced.

In some embodiments, the second absorbing component 5 is a compression spring. The connecting component 1 is connected to one end of the second absorbing component 5, the base 2 is connected to another end of the absorbing component 5. When the connecting component 1 slides in the first groove 21, the connecting component 1 and the base 2 squeeze the second absorbing component 5, and the second absorbing component 5 is deformed to absorb the kinetic energy.

In some embodiments, a mounting groove 12 is defined in one end of the connecting component 1 toward the base 2, an opening of the mounting groove 12 towards the bottom of the first groove 21. The base 2 is provided with a fixing portion 23, the fixing portion 23 and the second absorbing component 5 are installed in the mounting groove 12. The connecting component 1 is connected to one end of the second absorbing component 5, the fixing portion 23 is connected to another end of the second absorbing component 5.

In one embodiment, a bottom surface of the first groove 21 overlaps a projection of the second absorbing component 5 in the depth direction of the first groove 21. The bottom of the first groove 21 can contact the second absorbing component 5, a contact part of the bottom of the first groove 21 and the second absorbing component 5 is formed the fixed portion 23.

In other embodiments, the bottom of the first groove 21 can also be provide with other mechanical structures to form the fixing portion 23. For example, a support block is provided at the bottom of the first groove 21 to form the fixing portion 23.

One end of the second absorbing component 5 abuts against one side of the fixing portion 23 facing the bottom of the mounting groove 12, another end of the second absorbing component 5 abuts against the bottom of the mounting groove 12. When the connecting component 1 is sliding in the first groove 21, the fixing portion 23 moves towards a depth of the mounting groove 12, a distance between the fixing portion 23 and the mounting groove 12 becomes shorter, and the second absorbing component 5 is deformed.

Figure 6:
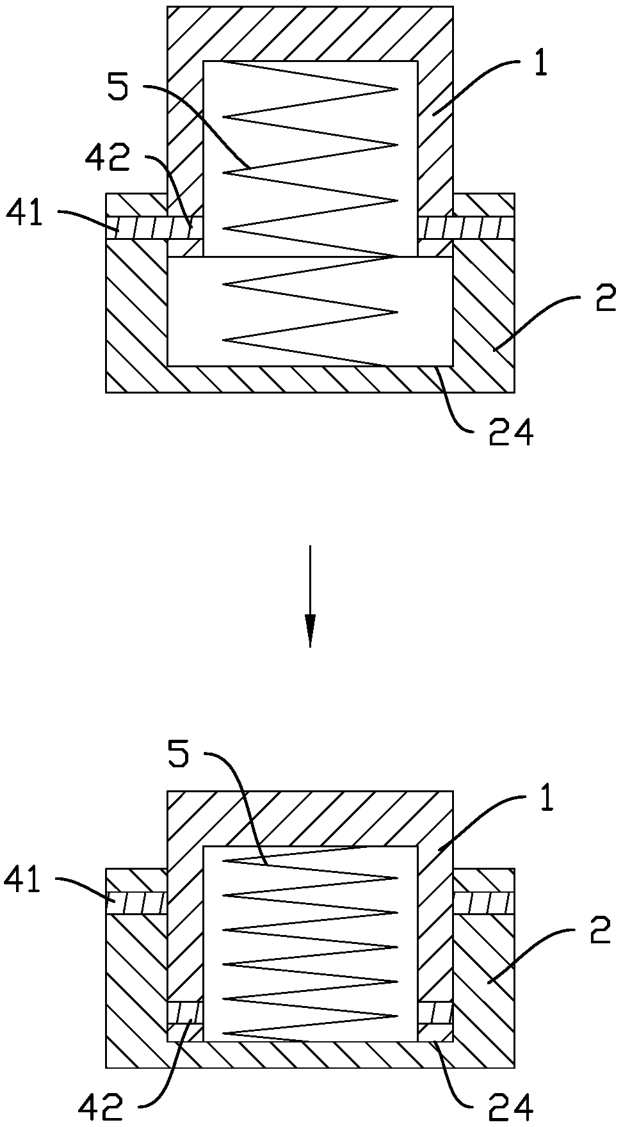
FIG. 6 illustrates an embodiment of a comparison diagram of the monitor holder in a normal state and in an impact state in the present disclosure.

Referring to FIG. 6, in one embodiment, when the monitor holder 10 is in the normal state, the plurality of first absorbing components 4 can maintain the rest state between the connecting component 1 and the base 2, the second absorbing component 5 also supports the connecting component 1 and the base 2, the second absorbing component 5 is not deformed.

When the monitor holder 10 is in the impact state, the plurality of first absorbing components 4 absorbs the kinetic energy and breaks, the connecting component 1 moves towards the base 2, the second absorbing component 5 also absorbs the kinetic energy and is deformed to achieve multi-stage buffering effect.

Referring to FIG. 3 and FIG. 6, in one embodiment, the base 2 is provided with an absorbing portion 24, the absorbing portion 24 is arranged at the bottom of the first groove 21, the absorbing portion 24 is deformed by the connecting component 1, when the absorbing portion 24 extends through a sliding path of the connecting component 1.

Specially, when the monitor holder 10 is in the impact state, an impact of the connecting component 1 on the absorbing portion 24 exceeds a bearing capacity of the absorbing portion 24, the absorbing portion 24 breaks and absorbs the kinetic energy to achieve the buffering effect, and the safety is improved.

In some embodiments, a shape of one end of the connecting component 1 received in the first groove 21 is cylinder-shaped, a cross section of the first groove 21 and a peripheral outline of the fixing portion 23 are circular, an inner diameter of the first groove 21 is larger than an outer diameter of the connecting component 1, an outer diameter of the fixing portion 23 is less than an inner diameter of the connecting component 1. A distance is provided between the outer diameter of the fixing portion 23 and a wall of the first groove 21, a part of the bottom of the first groove 21 arranged around the fixing portion 23 is the absorbing portion 24.

In some embodiments, the monitor holder 10 further includes a plurality of fixing screws 14. A plurality of threaded holes is defined on the end of the connecting component 1 towards the base 2. The plurality of fixing screws 14 is threaded to the plurality of threaded holes. The plurality of fixing screws 14 go through the absorbing portion 24 and is threaded to the connecting component 1 to limit a maximum distance between the connecting component 1 and the base 2. The connecting component 1 and the base 2 abut against the second absorbing component 5.

Referring to FIG. 6, in one embodiment, when the monitor holder 10 is in the normal state, a distance between the absorbing portion 24 and the connecting component 1 is generated. The distance between the absorbing portion 24 and the connecting component 1 provides a space, and the connecting component 1 can slide in the space. When the monitor holder 10 is in the impact state, the plurality of the first absorbing components 4 breaks to absorb the kinetic energy in a first stage, the connecting component 1 moves towards the base 2 to compress the second absorbing component 5. The second absorbing component 5 is deformed to absorb the kinetic energy in a second stage. The connecting component 1 hits the absorbing portion 24, the absorbing portion 24 breaks to absorb the kinetic energy in a third stage. The multi-stage buffering effect is achieved, and the safety of the user is improved.

Referring to FIG. 1 and FIG. 2, one embodiment of the present application discloses a vehicle monitor device 40. The vehicle monitor device 40 includes the vehicle monitor 20 and the monitor holder 10, the vehicle monitor 20 is connected to the connecting component 1 of the monitor holder 10. In some embodiments, the connecting component 1 is provided with a flange member 13, the vehicle monitor 20 is arranged on the flange member 13.

The vehicle monitor device 40 can be applied to autonomous vehicles. For example, the monitor holder 10 can be installed on the vehicle body, and the vehicle monitor 20 can be arranged in the vehicle. The vehicle body is provided with the rotating base 30, the base 2 is relatedly connected to the rotating base 30, and the monitor holder 10 and the vehicle monitor 20 constitute the rotating vehicle monitor mechanism.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A monitor holder for holding a monitor to a vehicle body, the monitor holder comprising:

a connecting component connected to the monitor;

a base defining a first groove, wherein the connecting component is arranged in the first groove, the first groove is provided with a space configured for the connecting component to slide, and the base is connected to the vehicle body;

an absorbing component arranged between the connecting component and the base, wherein the connecting component and the base abut against the absorbing component, the base wraps around the connecting component in response to the absorbing component been deformed, the absorbing component comprising a plurality of first absorbing components and a second absorbing component, wherein the plurality of first absorbing components is arranged between the connecting component and the base and resists a shear force between the connecting component and the base, and the second absorbing component is arranged between the connecting component and the base and resists a pressure between the connecting component and the base; wherein a mounting groove is defined in one end of the connecting component toward the base, the base comprises a fixing portion, the fixing portion and the second absorbing component are installed in the mounting groove, the connecting component is connected to one end of the second absorbing component, the fixing portion is connected to another end of the second absorbing component;

the base further comprises an absorbing portion arranged in the first groove and around the fixing portion, the absorbing portion is deformed by the connecting component in response to the absorbing portion been extended through a sliding path of the connecting component.

2. The monitor holder as claimed in claim 1, wherein the second absorbing component is a compression spring, the connecting component is connected to one end of the second absorbing component, the base is connected to another end of the second absorbing component.

3. The monitor holder as claimed in claim 1, wherein each of the plurality of first absorbing components comprises a first end and a second end, the first end is connected to the base, the second end is connected to the connecting component, an angle is defined between a length direction of the plurality of first absorbing components and a sliding direction of the connecting component.

4. The monitor holder as claimed in claim 3, wherein a plurality of mounting holes is defined on the base, the plurality of mounting holes is communicated with the first groove, a plurality of fixed holes is defined on the connecting component, the plurality of fixed holes is communicated with the first groove, the plurality of mounting holes is corresponded with the plurality of fixed holes, the first end is arranged in the plurality of mounting holes, the second end is arranged in the plurality of fixed holes.

5. The monitor holder as claimed in claim 3, wherein the first end is threaded with the base, and the second end is threaded with the connecting component.

6. The monitor holder as claimed in claim 3, wherein the first end is threaded with the base, or the second end is threaded with the connecting component.

7. The monitor holder as claimed in claim 1, wherein the plurality of first absorbing components is distributed around the connecting component.

8. The monitor holder as claimed in claim 1, wherein the plurality of first absorbing components is distributed around the base in a circumferential direction.

9. The monitor holder as claimed in claim 1, wherein a length direction of the plurality of first absorbing components is perpendicular to a length direction of the connecting component.

10. The monitor holder as claimed in claim 1, wherein a shape of one end of the connecting component received in the first groove is cylinder-shaped, a cross section of the first groove and a peripheral outline of the fixing portion are circular, an inner diameter of the first groove is larger than an outer diameter of the connecting component, an outer diameter of the fixing portion is less than an inner diameter of the connecting component.

11. The monitor holder as claimed in claim 1, wherein the monitor holder further comprises a plurality of fixing screws, a plurality of threaded holes is defined on the end of the connecting component towards the base, the plurality of fixing screws is threaded to the plurality of threaded holes, the plurality of fixing screws go through the absorbing portion and is threaded to the connecting component.

12. A vehicle monitor device comprising:

a monitor and a monitor holder, wherein the monitor holder is attached to the monitor and a vehicle body; the monitor holder comprises a connecting component, a base and an absorbing component, wherein the connecting component is connected to the monitor, the base defines a first groove, the connecting component is arranged in the first groove, the first groove is provided with a space configured for the connecting component to slide, the base is connected to the vehicle body; the absorbing component is arranged between the connecting component and the base, the connecting component and the base abut against the absorbing component, the base wraps around the connecting component in response to the absorbing component been deformed;

the absorbing component comprises a plurality of first absorbing components and a second absorbing component, the plurality of first absorbing components is arranged between the connecting component and the base to bear a shear force between the connecting component and the base, and the second absorbing component is arranged between the connecting component and the base to bear a pressure between the connecting component and the base; wherein a mounting groove is defined in one end of the connecting component toward the base, the base comprises a fixing portion, the fixing portion and the second absorbing component are installed in the mounting groove, the connecting component is connected to one end of the second absorbing component, the fixing portion is connected to another end of the second absorbing component;

the base comprises an absorbing portion arranged in the first groove and around the fixing portion, the absorbing portion is deformed by the connecting component in response to the absorbing portion been extended through a sliding path of the connecting component.

13. The vehicle monitor device as claimed in claim 12, wherein the second absorbing component is a compression spring, the connecting component is connected to one end of the second absorbing component, the base is connected to another end of the second absorbing component.

14. The vehicle monitor device as claimed in claim 12, wherein each of the plurality of first absorbing components comprises a first end and a second end, the first end is connected to the base, the second end is connected to the connecting component, an angle is defined between a distribution direction of the first end and the second end and a sliding direction of the connecting component.

15. The vehicle monitor device as claimed in claim 14, wherein a plurality of mounting holes is defined on the base, the plurality of mounting holes communicates with the first groove, a plurality of fixed holes is defined on the connecting component, the plurality of fixed holes communicates with the first groove, the plurality of mounting holes is relatively arranged with the plurality of fixed holes, the first end is arranged in the plurality of mounting holes, the another end is arranged in the plurality of fixed holes.

* * * * *